Feb. 14, 1961  S. R. OVSHINSKY  2,972,029
PROXIMITY SWITCH
Filed March 6, 1957  2 Sheets-Sheet 1
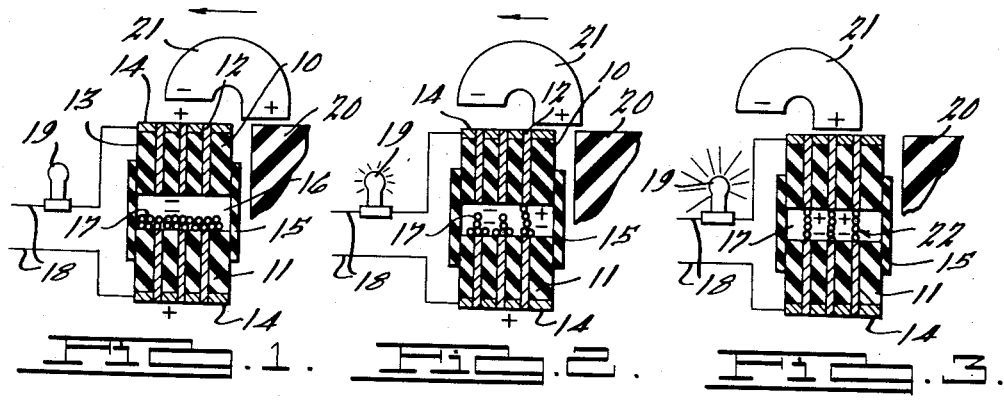
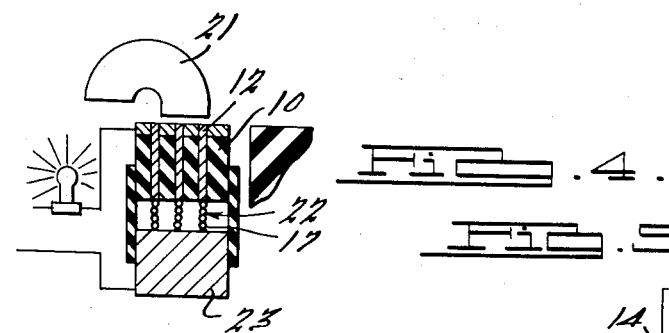
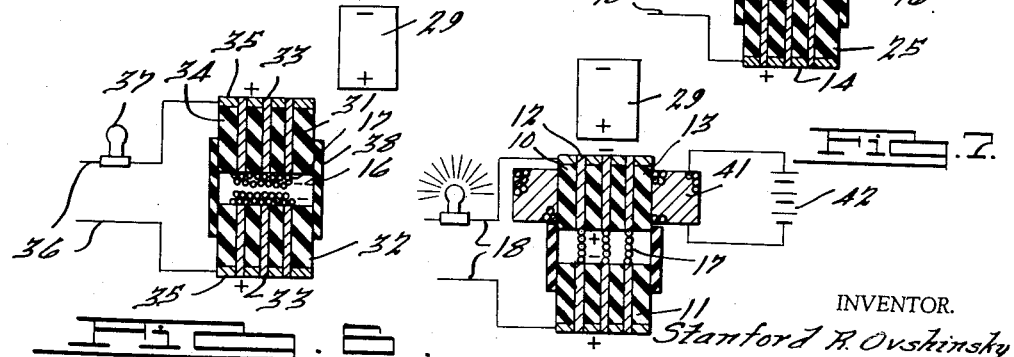
INVENTOR.
Stanford R. Ovshinsky
BY
Harness, Dickey & Pierce
ATTORNEYS.

Feb. 14, 1961  S. R. OVSHINSKY  2,972,029
PROXIMITY SWITCH
Filed March 6, 1957  2 Sheets-Sheet 2
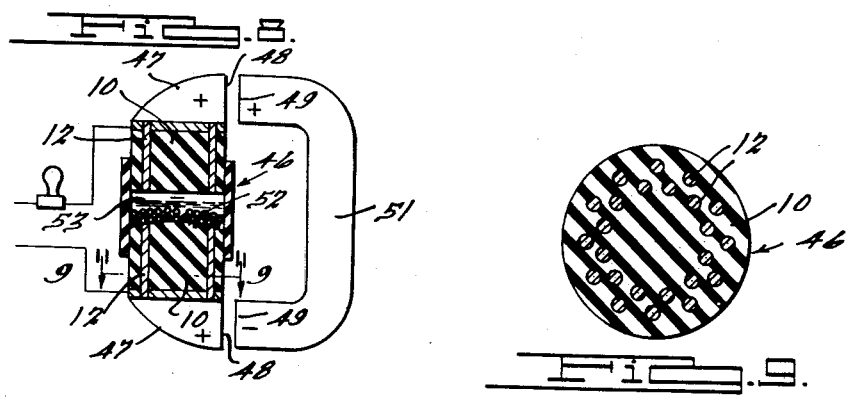
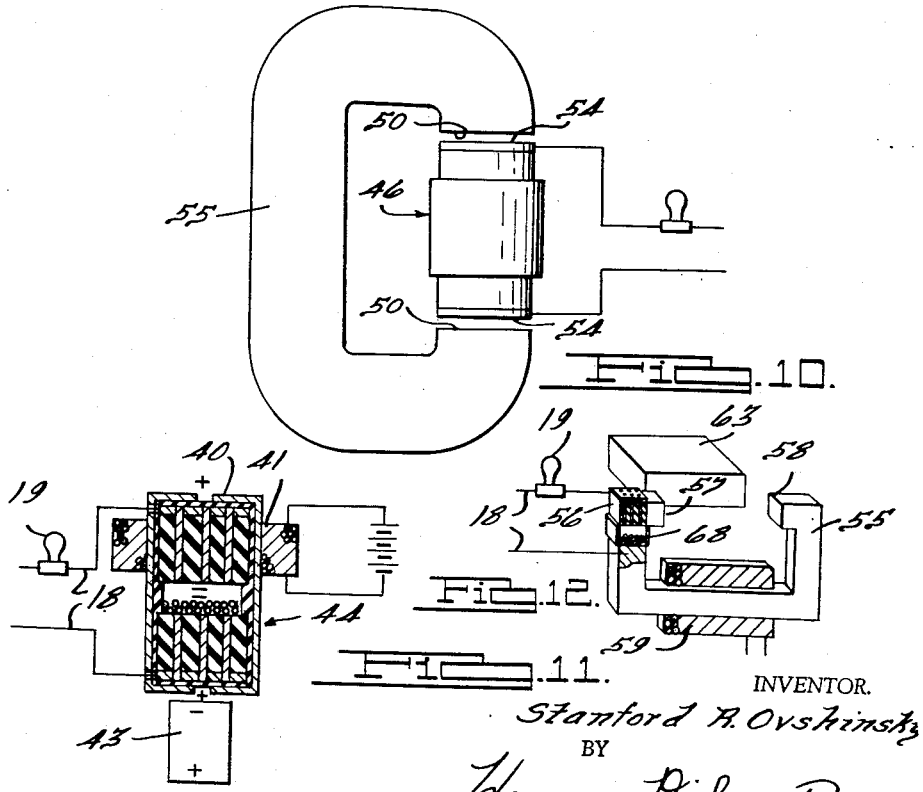
INVENTOR.
Stanford R. Ovshinsky
BY
Harness, Dickey & Pierce
ATTORNEYS.

ered Feb. 14, 1961

2,972,029
PROXIMITY SWITCH

Stanford R. Ovshinsky, Detroit, Mich., assignor to Tann Corporation, Detroit, Mich., a corporation of Michigan Filed Mar. 6, 1957, Ser. No. 644,228

18 Claims. (Cl. 200—87)

This invention relates to magnetic switches, and particularly to a magnetic switch of the proximity type.

The switch is constructed from one or more grids, each having a body of insulating material containing a plurality of conducting elements which are disposed in spaced relation and conductively joined at one end. A pair of the grids is spaced apart to form a cavity, with the ends of the elements in substantially aligned relation to provide focused flux paths between the grids. The paths form conductive chains of magnetizable or magnetic balls when the magnetic paths are of sufficient strength. The conducting elements of each grid are disposed within a circuit and the magnetizable balls within the cavity make and break the circuit. In one example the adjacent ends of the conducting elements are of like polarity if the elements are permanent magnets, to thereby repel the balls and prevent the chains from forming.

A perment magnet is employed to control the polarity and strength of flux paths. The magnet herein illustrated has a short leg which produces a repellent flux across the cavity to assist the breaking of the chains. When the elements of the grids are permanent magnets, the polarity of the ends of the elements at opposite sides of the cavity is alike and the balls therebetween are repelled. As the magnet and the grids are moved relative to each other, the longer leg of the magnet produces a change in flux and a reversal of polarity in the elements of the adjacent grid, to have an attractive force between the elements across the cavity. In either instance the balls are attracted and formed into conducting chains between the elements of the grids. As a magnet of the horseshoe, bar, coil or other type is moved relative to the device into exact aligned relation therewith, all of the elements of the adjacent grid will have such polarity that chains will be formed between all of the elements, to thereby produce a maximum flow of current through the device. A C-shaped horseshoe magnet may be employed having the ends spaced apart a sufficient distance to permit the grids to pass thereover or therebetween. If the device is attached to a point adjacent to a flywheel and the magnet carried by the flywheel, each time the magnet passes by the device a current would flow in the circuit thereof and would be immediately interrupted. The same result occurs with a reciprocating bed of a machine when the magnet or device is carried by the bed and the other element of the pair is disposed adjacent to the bed at a point where a signal is desired. Upon the approach of the device and magnet, a circuit will be completed which may be employed to reverse the reciprocation of the bed. Such a proximity switch has many applications, is exceedingly simple in construction and inexpensive of manufacture. It is one object of the invention to use a material for the metal elements of the grids and for the balls which has the strains released therefrom by proper annealing so that the material will become magnetically saturated with the lowest amount of applied energy and which will become demagnetized in the shortest amount of time after the applied energy is cut off. The elements and balls have substantially no residual properties and upon a change in applied energy, such as to remove the force for retaining the balls in conducting chains, they will immediately separate and fall to the bottom of the cavity by gravity. Where the flux is reversed or the balls have like charges thereon, in addition to the gravity a repellent force will assure the rapid disintegration of the chains.

Other objects of the invention are: to provide a proximity switch of the magnetic type which causes a current to flow through a circuit when the switch is moved into proximity of a magnetic field; to form a magnetic proximity switch from a grid having a plurality of elements in an insulating body, with the grids spaced apart to form a cavity containing a plurality of balls which form chains when the grids are moved into proximity of a magnetic field; to provide a magnetic switch with a cavity having a plurality of magnetic or magnetizable balls therein which form conducting chains when the device is moved into a magnetic field; to provide a proximity switch which completes a circuit when the switch and magnetic field are brought into proximity of each other, and, in general, to provide a proximity switch which is simple in construction, positive in operation and substantially indestructible.

Other objects and features of novelty of the invention will be specifically pointed out or will become apparent when referring, for a better understanding of the invention, to the following description taken in conjunction with the accompanying drawings, wherein:

Figure 1 is a broken sectional view of a proximity switch of the present invention connected in a circuit having a lamp therein;

Fig. 2 is a view of the structure illustrated in Fig. 1, with the magnet advanced relative to the switch and some of the chains formed to pass in the circuit indicated by the low illumination of the lamp;

Fig. 3 is a view of the structure illustrated in Fig. 2, with the magnet moved into aligned relation to the proximity switch forming all of the chains to cause a full flow of current indicated by the full illumination of the lamp;

Fig. 4 is a view of a proximity switch, similar to that illustrated in Fig. 3, showing another form thereof;

Fig. 5 is a view of structure, similar to that illustrated in Fig. 3, showing still another form of the switch grid;

Fig. 6 is a sectional view of structure, similar to that illustrated in Fig. 5, showing still another form of the invention;

Fig. 7 is a view of structure, similar to that illustrated in Fig. 6, showing another form which the invention may assume;

Fig. 8 is a view in elevation of a device, similar to that illustrated in Fig. 1, showing a further form of the invention;

Fig. 9 is a sectional view of the structure illustrated in Fig. 8, taken on the line 9—9 thereof;

Fig. 10 is a view of structure, similar to that illustrated in Fig. 8, showing another form which the invention may assume;

Fig. 11 is a view of structure, similar to that illustrated in Fig. 7, showing a still further form of the invention, and Fig. 12 is a perspective view of structure, similar to that illustrated in Fig. 10, showing another form which the invention may assume.

A relay is illustrated in the copending application of S. R. Ovshinsky, Serial No. 645,260, filed March 11, 1957, for Magnetic Relay, employing a plurality of grids for controlling the passage of current in a circuit. The same grids are employed in the present invention, so associated as to product a flow of current when a magnet is brought into proximity with the device or a flux path is otherwise completed therethrough. In the embodiments shown herein by way of example, grids 10 and 11 are illustrated, made up of a plurality of magnetizable or magnetic elements 12 which are maintained in predetermined relation to each other within an insulating body 13. The opposite ends of the grids have the elements 12 joined in conducting relationship by plates 14. A sleeve 15 supports the two grids 10 and 11 in spaced relation to each other and forms a cavity 16 in which a plurality of precision balls 17 are disposed. The balls are made to a predetermined diameter and accurate spherical form from a material, preferably of nickel and iron in a fifty-fifty ratio or a variation thereof, or of other material which requires small coercive forces to produce magnetic saturation of the balls. The balls are properly annealed to produce the low coercive force and low residual effects. When the elements 12 are permanent magnets, as illustrated in Fig. 1, those in the grid 10 may be of the same or opposite polarity to those in the grid 11 so that the adjacent ends of the elements 12 if of the same polarity will repel the balls 17 and if of different polarity but not of sufficient strength, the chains will not be formed. The separated balls interrupt the passage of current from a source through the conductors 18 attached to the plates 14 to a load, herein illustrated as a lamp 19.

It was mentioned that the grids are made of magnetic or magnetizable material separated from each other by the material of the grid body which is nonmagnetizable. Thus, the grid body may be made of ceramic or nonmagnetic stainless steel which will withstand annealing temperatures. Such material provides high precision control since the physical working by insertion of the grid elements after annealing into the apertures of the grid body would change the magnetic characteristics of the element material. A nonmagnetic material which will withstand the heat of annealing has apertures into which the elements are forced before the annealing operation. Preferably, the material selected is one which has a coefficient of expansion substantially equal to that of the material of the elements so that there will be no strains set up between the materials when a change in temperature occurs. The conducting plates 14 as illustrated may be employed to interconnect the elements, or silver or other conducting material may be built up on the body to connect the elements to a conductor. For example, stainless steel having nonmagnetic qualities has been employed as the body of the grid, the elements 13 being forced into the apertures thereof before the heat-treating process. The body material can also be a ceramic, resin or similar material which magnetically and electrically insulates the elements from each other.

To produce the passage of current through the device that is to say, through the two grids 10 and 11, a magnet 21 is moved in proximity to one of the grids, herein illustrated as grid 10. The magnet 21 has sufficient magnetic strength to change the polarity of the magnetic elements 12 of the grid 10 or add materially to the strength thereof. The adjacent ends of the elements 12 of theg rids 10 and 11 are of opposite polarity and of sufficient strength to attract the magnetizable balls 17 to form chains 22. The chains complete the circuit so that current from the source will pass through the conductors 18 in an increasing amount with the passage of the magnet 21, as illustrated by the lighted lamp 19 of Figs. 2 and 3. An initial surge of current is prevented upon the completion of the circuit as the chains are formed seriatim, thus building up the current flow in the circuit. This reduced initial flow of current is illustrated by the reduced illumination of the lamp 19 in Fig. 2 and the full illumination thereof in Fig. 3. This control is provided by the resistance material of the balls or resistance coating thereon and this control is not available if the balls are coated with a conducting material. It is to be understood that the elements 12 can also be magnetizable besides being permanent magnets as specified above, and can also be a solid element besides the grid form herein illustrated.

The balls may be coated with a conducting material, such as silver and the like, when the passage of as much current as possible is desired. It is within the purview of the invention to hermetically seal the device and evacuate the cavity 16 or provide the cavity with an inert gas to prevent the deterioration of the ball surface and to eliminate any fire hazard which might be present should the device be used in the presence of an explosive gas. Thus, by the movement of a magnetic element across the grid 10, the completion of a circuit is made to operate a load device. Such a proximity switch has many uses, controlling the degree of movement and reciprocation to a horizontal reciprocable bed, the degree of rotation of an element, or to stop the movement of any movable body by the approach of a magnet to the proximity switch or the switch to the proximity of a magnet, or as a magnetic detector to indicate the presence or passage of of magnetizable element relative thereto. In Figs. 1 to 4, the magnet 21 is illustrated as of the horseshoe type, with the shorter leg of opposite polarity to the long leg which aids in repelling the balls and the breaking of the chains when the magnetic is returned to its initial position of Fig. 1.

The device may take other forms than that illustrated and above described. In Fig. 4, the grid 10 only is employed, a metal body 23 of copper or any other conductive material being substituted for the grid 11 of Figs. 1, 2 and 3. In this relationship, the elements 12, if permanent magnets, are not of sufficient strength to form chains 22 from the balls 17. It is only when a magnetism is added thereto that sufficient flux will be present to produce the chains to pass the current through the load 19 whether or not a flux is present in the elements 12. When not permanent magnets, the elements 12 may be magnetizable, and/or of a conducting material, which are not permanent magnets, being energized by the magnet 21 when passed thereover to produce the chains which will be immediately broken when the magnet is returned to its initial position, that of Fig. 1. When the elements 12 are of conductive material, the body 23 is a magnet or of magnetizable material.

In Fig. 5 a further form of device is illustrated, that wherein a pair of grids 24 and 25 are similar to the grids 10 and 11, with the exception that the magnetizable elements 12 have coils of conducting wire 26 formed thereabout within the supportnig insulating member 27 with the ends joined together to short circuit the coils. The two grids are connected together by an insulating sleeve 28 to form the cavity 16 containing the balls 17. A circuit 18 is connected to the plates 14 and when a magnet 29, which is herein illustrated as a bar magnet but which could be of the horseshoe or other type, is moved over the device, chains 22 of the balls will form to pass a current to the load 19. Immediately upon the removal of the magnet 29 the balls will be maintained as chains for a short period because of the residual magnetism retained in the system. The coils 26 react immediately to induce a flow of flux in the elements 12 which counteracts the ebbing flux remaining therein to counteract the flux and demagnetizes the chains 22 so that they are broken in a minimum amount of time. The magnetic elements 12 of the grid 24 are magnetized in an opposite sense to those of grid 25 so that the adjacent ends are of the same polarity to have the elements repel the ball in the absence of the magnet 29. The strength of the magnet 29 is such as to overcome the magnetism of the magnetizable elements 12 of the grid 24 and reverse the polarity thereof to have the adjacent ends of the magnetic elements of the two grids produce an attractive force across the cavity to complete the chains 22. This produces an induced current in the coils 26 and an induced magnetism in the elements 12 of grid 25 of the same sense as the magnetic field of the elements 12 of the grid 25. When the magnet 29 is moved away from the device, the chains are immediately broken by the repellent force between the adjacent ends of the elements 12 of the grids.

In Fig. 6 a construction is illustrated similar to Fig. 5 wherein grids 31 and 32 have magnetizable elements 33 therein which are permanent magnets. The elements are embedded in predetermined relation to each other in an insulating material 34. The elements are conductively joined at opposite ends by plates 35 disposed within a circuit 36 having a load 37, herein illustrated as a lamp. An insulating sleeve 38 connects the two grids together, providing a cavity 16 therebetween which contains the precision balls 17. Certain of the balls will be attracted to permanent magnets 33 of both of the grids but a repellent force will interrupt any contact between the balls attracted to the opposite grids. When the magnet 29 is passed over the device, the strength thereof is sufficient to reverse the polarity of the magnetizable elements 33 of the grids 31 or reduce the magnetic effect thereof, to thereby provide an attractive force between the elements 33 of the two grids and produce chains 22 from the balls 17 to complete a circuit through the conductors 36 to the load 37.

By employing a horseshoe type of magnet, as illustrated in Figs. 1 to 3, the one arm will increase the repellent force naturally existing between the magnetizable elements of the two grids 10 and 11 by acting on the elements of grid 10, as illustrated in Fig. 1. When the opposite arm is advanced over the device, the polarity is reversed in the magnetizable elements of the grid 10, causing an attractive force to occur between the elements of the two grids across the cavity to form the conducting chains. If the balls are not coated with a conducting material, the progressive forming of the chains provides a variable increasing signal, surges are prevented, and an initial warning provided for operating other devices so that certain of the devices function in accordance with a differential principle. As the magnet is moved from the position of Fig. 3 back into the position of Fig. 1, the repelling arm moves over the device, increasing the repellent effect between the magnetizable elements of the two grids, to thereby quickly break the chains. The magnetizable material 20 adjacent to the device improves the flux path and strengthens the magnetic field of the horseshoe magnet when in the position illustrated in Figs. 1 and 2.

A similar device is illustrated in Fig. 7 wherein grids 10 and 11 have magnetizable elements 12 therein which may be permanent magnets or of magnetizable material energized by a bar magnet 29 and/or a coil 41. The elements 12 of the grid 11 are permanent magnets of such strength relative to the permanent magnets 12 of the grid 10 as to attract the balls 17 and form chains when the bar magnet 29 is moved adjacent to the grid 10, as illustrated in the figure. The chains will remain formed when the magnet 29 is removed unless the coil 41 about the grid 10 is energized from a battery 42 to provide a flux of sufficient strength to produce a repellent force between the elements 12 of the two grids to break the chains. The return of the magnet 29 will provide an attractive force between the adjacent ends of the elements 12 and chains will form to provide a conductive current path. Upon the removal of the bar magnet 29, the chains will be immediately broken because of the repellent force across the chains caused by the flux from the coil 41. The flow of current to the coil 41 may be from any signal device, it being necessary that the current is supplied to the coil 41 at the time the magnet 29 passes over the grid 10 to make the conducting chains and complete the circuit 18. This requires coordination between the flux provided by the coil and magnet to complete a circuit through the balls and circuit 18 so that a circuit can be completed only when the coil and maget are properly energized and positioned.

In another arrangement, when the coil 41 is energized, the chains between the elements 12 are formed and current is passed through the circuit 18. When the magnet 29 approaches the grid 10, the chains start to break as the flux of the magnet opposes the flux from the coil, and by the time the magnet reaches aligned relationship with the grid, all of the chains will be broken and the circuit will be interrupted. By spacing the magnet from the grid to reduce its influence, or by varying the current on the coil 41, the number of chains remaining unbroken can be controlled so that the amount of current delivered by the circuit 18 may be regulated.

The structure illustrated in Fig. 11 is similar to that of Fig. 7 employed as a sensing device. The element 43 to be sensed is of a material which will strengthen a flux path so that when in the vicinity of the device 44 the flux path from the coil 41 is strengthened sufficiently to cause chains to be formed and current to flow in the conductors 18 which actuates a signal to indicate that the element 43 is in the vicinity of the device. This is assisted by an encompassing element 40 of magnetizable material which strengthens the flux path and shields the balls from surrounding magnetic distraction. Such an element can be employed advantageously on other of the grid devices herein illustrated. In this manner, the device 44 functions as a sensing device to indicate when elements 43 approach or are in the vicinity of the device 44. It is to be understood that sufficient current will be supplied from the battery 42 to the coil 41 to have a flux present which requires very little strengthening to produce the chains which are formed as soon as the element 43 approaches the device close enough to strengthen the flux path therethrough.

Referring to Fig. 8, the grid device 46 may be similar to the grid device of Fig. 1 having magnetizable ends 47 added thereto which have faces 48 spaced from the faces 49 of a magnet 51. The relative positions of the device and magnet produce or interrupt chains between the grid elements 10 and 11 across the cavity therebetween in a manner as pointed out hereinabove. The device interrupts or makes a circuit in the absence or presence of the magnet 51 to operate a servo mechanism and perform a desired function. It will be noted from Fig. 9 that the grids have a plurality of the magnets or magnetizable elements 12 disposed in two circular rows to have the center portion blank so that the chains will be formed at the outer portion of the grids. It will be noted that the bottom grid has a truncated conical top portion 52 which causes the balls to roll toward the outer side when a chain is broken. The space above the top portion 52 may be covered with a pool of mercury which coats the balls and forms conducting paths of larger diameters at the point of engagement between the balls and assists in preventing any arcing between the balls or elements 12 when the chains are interrupted. In a similar manner, the space may be evacuated or an inert gas provided thereto.

In Fig. 10 a similar structure is illustrated, that wherein the device 46 has its end faces 54 so disposed as to pass between the end faces 50 of a C-shaped permanent magnet 55. When the movable element upon which the device 46 or the magnet 55 is mounted is moved relative to the other which is mounted in fixed relation, the device 46 and the magnet 55 will move into aligned relation, as illustrated in Fig. 10, to complete a circuit which will be broken when the magnet and device are separated. It will be noted that the device 46 has the magnetizable elements 47 removed from the ends thereof and that the ends of the grids form the faces 54 which are disposed adjacent to the faces 50 of the magnet 55.

In Fig. 12, a further form of the invention is illustrated, that wherein a U-shaped soft iron magnet 55 has a grid device 56 at one end providing a pole piece 57 aligned with a pole piece 58 on the opposite end of the magnet 55. A coil 59 is disposed about the core, energized from a suitable source to provide a magnetic field across the pole pieces 57 and 58 which is insufficient to produce a conductive chain from the group of balls 61 within the cavity 62 of the device. A magnetic element 63 is so positioned that when the magnet 55 and element are moved relative to each other, the element 63 will pass between the pole pieces 57 and 58, thereby substantially eliminating the air gap in the flux path and instantaneously forming chains from the balls 61 across the cavity. This completes a circuit through the conductors 18 and to the load 19 therein. As soon as the magnetic element 63 passes through or is withdrawn from between the pole pieces 57 and 58, the chains of the balls formed across the cavity 61 will be broken, thus interrupting the circuit.

What is claimed is:

1. In a proximity switch, magnetizable means having a cavity therein connected across a circuit, a plurality of magnetizable balls within the cavity, and a magnet which produces an attractive flux path across the cavity when relatively moved to the vicinity thereof to cause chains of the balls to form and complete the circuit, the removal of the magnet permitting the magnetizable means to produce a repellent flux across the cavity.

2. In a proximity switch, a grid having an insulating body and a plurality of conducting elements therein, a conducting element spaced from said grid forming a cavity therebetween, a plurality of magnetizable balls within the cavity, a magnet movable relative to said grid, and a coil about said body for producing a magnetic effect upon said elements opposed to that of the magnet.

3. In a proximity switch, a grid having an insulating body and a plurality of conducting elements therein, a like grid spaced from said first grid forming a cavity therebetween, a plurality of magnetizable balls within the cavity, a magnet movable relative to said grids, and a coil about one of said grids for producing a magnetic effect upon said elements.

4. In a proximity switch, a pair of grids, each said grid embodying an insulating body, a plurality of elongated conducting elements within said body disposed in aligned relation to each other and spaced from each other to form a cavity therebetween, conducting elements joining the remote ends of said elements permitting the elements to be placed within a circuit, and a plurality of magnetizable balls within the cavity from which conducting chains are made between the ends of said elements when a magnetic field is moved into proximity to said cavity.

5. In a proximity switch, a pair of grids, each said grid embodying a body of nonmagnetic material, a plurality of elongated conducting elements within said body disposed in aligned relation to each other, a pair of said grids being spaced from each other to form a cavity therebetween, conducting elements joining the remote ends of said elements permitting the elements to be placed within a circuit, a plurality of magnetizable balls within the cavity from which conducting chains are made between the ends of said elements under the influence of a magnetic field, and a horseshoe type magnet, the polarity at the end of one leg when aligned with the grids causing the flux at the adjacent ends of the elements to repel the balls, the polarity at the end of the other leg when aligned with the grids causing the flux at the adjacent ends of the elements to attract and form conducting chains from said balls.

6. In a proximity switch, a pair of grids, each said grid embodying a body of nonmagnetic material, a plurality of elongated conducting elements within said body disposed in aligned relation to each other, a pair of said grids being spaced from each other to form a cavity therebetween, conducting elements joining the remote ends of said elements permitting the elements to be placed within a circuit, a plurality of magnetizable balls within the cavity from which conducting chains are made between the ends of said elements under the influence of a magnetic field, a coil for applying a flux across said grids, and a magnet applying a flux which is superimposed on the flux of said coil.

7. In a proximity switch, a pair of grids, each said grid embodying a body of nonmagnetic material, a plurality of elongated conducting elements within said body disposed in aligned relation to each other, a pair of said grids being spaced from each other to form a cavity therebetween, conducting elements joining the remote ends of said elements permitting the elements to be placed within a circuit, a plurality of magnetizable balls within the cavity from which conducting chains are made between the ends of said elements under the influence of a magnetic field, a coil for applying a flux across said grids, a magnet applying a flux which is superimposed on the flux of said coil, and means for varying the flux by varying the current on the coil and by shifting the position of said magnet.

8. In a proximity switch, means having a cavity, a plurality of magnetizable balls within the cavity, a magnetizable element associated with said grid means, a coil associated with said magnetizable element for providing a flux path across said cavity insufficient to produce chains of the balls thereacross, and means movable relative to said magnetizable means for strengthening the field across said cavity to produce conductive chains of the balls thereacross.

9. A proximity switch as recited in claim 1 wherein said magnet is of the horseshoe type one end of which produces an attractive flux path across said cavity, the other end of which produces a repellent flux path thereacross.

10. In a proximity switch, a body having a cavity therein, electrically conducting flux concentrating means in said body on opposite sides of said cavity for establishing a plurality of separate flux paths across said cavity, a plurality of magnetizable balls within the cavity, and a magnet which produces attractive lines of flux in said first-mentioned means which extend across said cavity along said paths to cause chains of the balls to form and complete a circuit across the cavity when the magnet is moved into the vicinity of said first-mentioned means, the removal of the magnet breaking the chains of balls by interrupting the lines of flux.

11. The invention is defined in claim 10 wherein said magnet is a horseshoe magnet, one end of said horseshoe magnet producing the attractive lines of flux in said first-mentioned means to cause chains of the balls to form, the other end of the horseshoe magnet repelling the balls and breaking the chains.

12. The invention is defined in claim 10 including coil means about said flux concentrating means to immediately suppress the flux therein when the magnet is moved away.

13. In a proximity switch, a body having a cavity therein, electrically conducting flux concentrating means in said body on opposite sides of said cavity for establishing a plurality of separate flux paths across said cavity, a plurality of magnetizable paths within the cavity, and magnetic means for selectively producing attractive lines of flux in said first-mentioned means which extend across said cavity along said paths to cause chains of the balls to form and complete a circuit across the cavity, and for selectively producing a repellent force across said cavity to interrupt said chains of balls.

14. The invention is defined in claim 10 including a magnetizable element substantially surrounding said switch to strengthen the flux path thereabout.

15. The invention is defined in claim 10 wherein said flux concentrating means includes at least one grid of nonmagnetizable material having elongated elements of magnetizable material extending therethrough.

16. The invention is defined in claim 15 wherein a plurality of said magnetizable elements are disposed in said grid in spaced apart relation and substantially in a circle inwardly of the peripheral wall and outwardly of the center of the grid.

17. The invention is defined in claim 16 wherein the portion of the flux concentrating means on the side of the cavity opposite to the magnetizable elements has a conical surface to enable the balls to roll downwardly and outwardly from the center of said cavity when the chains are broken.

18. The invention is defined in claim 10 wherein said magnet comprises a U-shaped core element of soft iron having the ends thereof facing each other and forming pole pieces on opposite sides of said body, a coil about said core, and a movable magnetizable element movable into a position between said body and one of said pole pieces, said balls forming chains to complete a circuit across the cavity when the magnetizable element approaches or passes through said position between the body and one pole piece to increase the conductivity of the flux path.

References Cited in the file of this patent

UNITED STATES PATENTS

| | | |
|---|---|---|
| 680,704 | Dion | Aug. 20, 1901 |
| 781,993 | Bell | Feb. 7, 1905 |
| 1,225,507 | Sedgwick | May 8, 1917 |
| 1,348,842 | Barlow | Aug. 10, 1920 |
| 2,015,156 | Richmond | Sept. 24, 1935 |
| 2,660,640 | Wolf | Nov. 24, 1953 |
| 2,668,884 | Jacobs | Feb. 9, 1954 |
| 2,687,500 | Jones | Aug. 24, 1954 |
| 2,715,166 | Fitch | Aug. 9, 1955 |
| 2,770,697 | Kellett | Nov. 13, 1956 |